(12) United States Patent
Schorzman et al.

(10) Patent No.: US 7,538,160 B2
(45) Date of Patent: May 26, 2009

(54) TRIFLUOROVINYL AROMATIC CONTAINING POLY(ALKYL ETHER) PREPOLYMERS

(75) Inventors: Derek Schorzman, Pittsford, NY (US); Joseph C. Salamone, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 567 days.

(21) Appl. No.: 11/173,705

(22) Filed: Jul. 1, 2005

(65) Prior Publication Data
US 2007/0004897 A1    Jan. 4, 2007

(51) Int. Cl.
*C08F 114/18*    (2006.01)

(52) U.S. Cl. ............... 525/326.2; 525/50; 525/292; 526/211; 526/242

(58) Field of Classification Search .............. 525/326.2, 525/50, 292; 526/211, 242
See application file for complete search history.

(56) References Cited

U.S. PATENT DOCUMENTS

| | | |
|---|---|---|
| 3,114,778 A | 12/1963 | Fritz et al. |
| 3,310,606 A | 3/1967 | Fritz et al. |
| 3,326,984 A | 6/1967 | Anderson et al. |
| 3,397,191 A | 8/1968 | Beckerbauer |
| 3,408,429 A | 10/1968 | Wichterle |
| 3,660,545 A | 5/1972 | Wichterle |
| 4,113,224 A | 9/1978 | Clark et al. |
| 4,197,266 A | 4/1980 | Clark et al. |
| 4,440,918 A | 4/1984 | Rice et al. |
| 4,555,732 A | 11/1985 | Tuhro |
| 4,954,587 A | 9/1990 | Mueller |
| 4,990,582 A | 2/1991 | Salamone |
| 4,996,275 A | 2/1991 | Ellis et al. |
| 5,010,141 A | 4/1991 | Mueller |
| 5,021,602 A | 6/1991 | Clement et al. |
| 5,023,380 A | 6/1991 | Babb et al. |
| 5,037,917 A | 8/1991 | Babb et al. |
| 5,037,918 A | 8/1991 | Babb |
| 5,037,919 A | 8/1991 | Clement et al. |
| 5,066,746 A | 11/1991 | Clement et al. |
| 5,079,319 A | 1/1992 | Mueller |
| 5,091,500 A | 2/1992 | Lysenko et al. |
| 5,159,036 A | 10/1992 | Babb |
| 5,159,037 A | 10/1992 | Clement et al. |
| 5,159,038 A | 10/1992 | Babb et al. |
| 5,196,569 A | 3/1993 | Hung |
| 5,198,513 A | 3/1993 | Clement et al. |

(Continued)

FOREIGN PATENT DOCUMENTS

EP    0084406 A1    7/1983

(Continued)

OTHER PUBLICATIONS

Rizzo et al., Polymer, vol. 41, pp. 5125-5136, (2000).*

(Continued)

*Primary Examiner*—Peter D. Mulcahy
*Assistant Examiner*—Henry Hu
(74) *Attorney, Agent, or Firm*—John E. Thomas

(57) ABSTRACT

The present invention provides prepolymers based on poly (alkyl ethers) having terminal triflurovinyl aromatic containing groups and polymers produced from such polymers. The prepolymers and polymers are useful as biomedical devices such as contact lenses or intraocular lenses.

14 Claims, 4 Drawing Sheets

U.S. PATENT DOCUMENTS

| | | | |
|---|---|---|---|
| 5,210,265 | A | 5/1993 | Clement et al. |
| 5,225,515 | A | 7/1993 | Lysenko et al. |
| 5,246,782 | A | 9/1993 | Kennedy et al. |
| 5,268,511 | A | 12/1993 | Farnham |
| 5,271,875 | A | 12/1993 | Appleton et al. |
| 5,313,003 | A | 5/1994 | Krüger et al. |
| 5,364,547 | A | 11/1994 | Babb et al. |
| 5,364,917 | A | 11/1994 | Babb et al. |
| 5,391,796 | A | 2/1995 | Farnham |
| 5,409,777 | A | 4/1995 | Kennedy et al. |
| 5,426,164 | A | 6/1995 | Babb et al. |
| 5,965,631 | A * | 10/1999 | Nicolson et al. ............ 523/106 |
| 6,559,237 | B1 | 5/2003 | Mao et al. |
| 6,646,075 | B2 | 11/2003 | Mao et al. |
| 6,649,715 | B1 | 11/2003 | Smith et al. |
| 7,091,283 | B2 * | 8/2006 | Muller et al. ............... 525/292 |
| 2002/0007083 | A1 | 1/2002 | DesMarteau et al. |
| 2002/0065382 | A1 | 5/2002 | Mao et al. |

FOREIGN PATENT DOCUMENTS

| | | |
|---|---|---|
| EP | 84406 A1 * | 7/1983 |
| WO | WO 94/25547 | 11/1994 |
| WO | WO-2007/005334 A1 * | 1/2007 |

OTHER PUBLICATIONS

Smith et al., Macromolecules, vol. 29, pp. 852-860 (1996).*
Babb et al., "Perfluorocyclobutane Aromatic Ether Polymers. III. Synthesis and Thermal Stability of a Thermostat Polymer Containing Triphenylphosphine Oxide", *Journal of Applied Polymer Science*, vol. 69, pp. 2005-2012 (1998).
Babb et al., "Perfluorocyclobutane Aromatic Ether Polymers", *Journal of Polymer Science: Part A: Polymer Chemistry*, vol. 31, pp. 3465-3477 (1993).
Babb et al., "Perfluorocyclobutane Aromatic Ether Polymers", *Polymer. Prepr.*, 34(1), pp. 413-414 (1993).
Boone et al., "A New Aromatic Perfluorocyclobutane Polymer: Synthesis and Thermal Characterization of 1,3,5-Tris[(4-trifluorovinyloxy)phenyl]benzene", *Polymer. Prepr.*, 39 (2), pp. 812-813 (1998).
Brandwood et al., J. Fluorine Chem. vol. 6, pp. 37-57 (1975).
Choi et al., "Synthesis and polymerization of trifluorovinylether-terminated imide oligomers I", *Polymer* 41, pp. 6213-6221 (2000).
Haken, "Studies in Trans-Esterification IV", *J. Appl. Chem.*, vol. 16 (March), p. 89 (1966).
Jasper et al., "New Monomers and Polymers Based on Trifluorovinyl Ether Functionalized Organosilanes, Siloxanes and Aminosilanes", Book of Abstracts, 215th ACS National Meeting, Dallas, Mar. 29,-Apr. 2, 1998, 425.
Ji, et al., "[p-((Trifluorovinyl)oxy)phenyl]lithium: Formation, Synthetic Utility and Theoretical Support for a Versatile New Reagent in Fluoropolymer Chemistry" *Organometallics*, vol. 17, pp. 783-785 (1998).
Jin et al., "Synthesis and Characterization of Phenylphosphine Oxide Containing Perfluorocyclobutyl Aromatic Ether Polymers for Potential Space Applications", *Macromolecules*, vol. 36, pp. 9000-9004 (2003).
Kang, et al., "A Hyperbranched Aromatic Fluoropolyester for Photonic Applications", *Macromolecules*, vol. 36, pp. 4355-4359 (2003).
Kennedy et al., "Perfluorocyclobutane Aromatic Ether Polymers. II. Thermal/Oxidative Stability and Decomposition of a Thermoset Polymer", *Journal of Polymer Science: Part A: Polymer Chemistry*, vol. 33, pp. 1859-1865 (1995).
Kumar et al., "Synthesis and Polymerization of 1,1,1-tris(4-trifluorovinyloxyphenyl)2,2,2-trifluoroethane. A New Low Loss Optical Polymer", *Polymer Preprints*, vol. 42(2), pp. 500-501 (2001).

Ligon et al., "First separation of characterization of *cis* and *trans* 1,2-bisaryloxy perfluorocyclobutanes", *Journal of Fluorine Chemistry*, vol. 123, pp. 139-146 (2003).
Liou et al., "The Effect of Crosslinking on Thermal and Mechanical Properties of Perfluorocyclobutane Aromatic Ether Polymers", *Journal of Polymer Science: Part B: Polymer Chemistry*, vol. 36, pp. 1383-1392 (1998).
Lousenberg et al., "Synthesis of Trifluorovinyl Ethane Incorporating Functionalized Hydrocarbon Ether Groups:Insights into the Mechanism of Trifluorovinyl Ether Formation from Trimethylsilyl 2-alkoxy-2,3,3,3,-tetrafluoropropionates", *J. Org. Chem.*, vol. 62, pp. 7844-7849 (1997).
Ma et al., "Novel Class of High-Performance Perfluorocyclobutane-Containing Polymers for Second-Order Nonlinear Optics", *Chem. Mater.*, vol. 12, pp. 1187-1189 (2000).
Mellon et al., "Kinetics and Radical Characterization of Aryl Trifluorovinyl Ether Polymerization Using ESR Spectroscopy", *Polymer Preprints*, vol. 44(1), pp. 1181-1182 (2003).
Rizzo et al., "Perfluorocyclobutane-containing silarylene-siloxane polymers with pendant trifluoropropyl groups", *Polymer. Prepr.*, 40(2), pp. 874-875 (1999).
Rizzo et al., "Preparation of Trifluorovinylether-terminated fluorosilicone oligomers" Book of Abstracts, 217th ACS Meeting, Anaheim, CA, Mar. 21-25, 1999.
Rizzo et al., "Synthesis and thermal properties of fluorosilicaones containing perfluorocyclobutane rings", *Polymer 41*, pp. 5125-5136 (2000).
Sarathy et al., "Fluorosilicone Networks From Trifluorovinyl Ether Pendant Polysiloxanes", *Polymer. Prepr.*, 39(1), pp. 530-531 (1998).
Sarathy et al., "Hydrosilation Polymerization and Thermal Cure of Divinyl Trifluorovinyl Ether Monomers", *Polymer. Prepr.*, 39(1), pp. 609-610 (1998).
Shah et al., "Perfluorocyclobutane (PFCB) Polymers for Optical Fibers and Dielectric Waveguides", *Polymer Prepr.*, 40(2), pp. 1293-1294 (1999).
Smith et al., "Crystalline Perfluorocyclobutane Polymers Containing the Hexafluoroisopropylidine Group", *Polymer Preprints*, vol. 41(1), pp. 60-61 (2000).
Smith et al. "Perfluorocyclobutyl Liquid Crystalline Fluoropolymers. Synthesis and Thermal Cyclopolymerization of Bis (trifluorovinyloxy)α-methylstilbene", *Macromolecules*, vol. 33 No. 4, pp. 1126-1128 (2000).
Smith et al., "Perfluorocyclobutane Aromatic Polyethers. Synthesis and Characterization of New Siloxane-Containing Fluoropolymers", *Macromolecules*, vol. 29, pp. 852-860 (1996).
Smith et al., "Fluorosilicones Containing the Perfluorocyclobutane Aromatic Ether Linkage", ACS Symposium Series (2000), 729 (Silicaones and Silicone-Modified Materials), Chapter 20, pp. 308-321.
Souzy et al., "Synthesis and (co)polymerization of monofluoro, difluoro, trifluorostyrene and ((trifluorovinyl)oxy)benzene", *Prog. Polym. Sci.*, vol. 29, pp. 75-106 (2004).
Topping et al., "Toward Crown Ether Containing Semifluoroinated Polyarylene Amides for Lithium Battery Membranes", *Polymer Preprints*, 43(1), pp. 486-487 (2002).
Wong et al., "Highly Fluorinated Trifluorovinyl Aryl Ether Monomers and Perfluorocyclobutane Aromatic Ether Polymers for Optical Waveguide Applications", *Macromolecules*, vol. 36, pp. 8001-8007 (2003).
Yuan et al., "Insights into the Properties of Novel Trifluorovinyl Ether Copolymers", *Macromolecules*, vol. 32, pp. 2669-2674 (1999).
Yuan et al., "Surface Enrichment of Poly(trifluorovinyl ether)s in Polystyrene Blends", *Macromolecules*, vol. 33, pp. 4926-4931 (2000).

* cited by examiner

TRIFLUOROVINYL AROMATIC CONTAINING POLY(ALKYL ETHER) PREPOLYMERS

BACKGROUND OF THE INVENTION

1. Technical Field

The present invention generally relates to trifluorovinyl aromatic containing poly(alkyl ether)prepolymers, e.g., poly (alkyl ether)prepolymers having terminal trifluorovinyl aromatic ether groups, and homo and copolymers produced from such prepolymers. The prepolymers and resulting polymers are useful as biomedical devices such as contact lenses or intraocular lenses.

2. Description of Related Art

In the field of biomedical devices such as contact lenses, various physical and chemical properties such as, for example, oxygen permeability, wettability, material strength and stability are but a few of the factors that must be carefully balanced in order to provide a useable contact lens. For example, since the cornea receives its oxygen supply exclusively from contact with the atmosphere, good oxygen permeability is a critical characteristic for any contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

Contact lenses made from fluorinated materials have been investigated for a number of years. Such materials can generally be subdivided into two major classes, namely hydrogels and non-hydrogels. Hydrogels can absorb and retain water in an equilibrium state whereas non-hydrogels do not absorb appreciable amounts of water. Regardless of their water content, both hydrogel and non-hydrogel fluorinated contact lenses tend to have relatively hydrophobic, non-wettable surfaces.

By introducing fluorine-containing groups into contact lens polymers, the oxygen permeability can be significantly increased. For example, U.S. Pat. No. 4,996,275 discloses using a mixture of comonomers including the fluorinated compound bis(1,1,1,3,3,3-hexafluoro-2-propyl)itaconate in combination with organosiloxane components. Fluorinating certain polysiloxane materials has been indicated to reduce the accumulation of deposits on contact lenses made from such materials. See, for example, U.S. Pat. Nos. 4,440,918; 4,954,587; 4,990,582; 5,010,141 and 5,079,319. However, fluorinated polymers can suffer from one or more of the following drawbacks: difficult and/or expensive synthetic routes, poor processability, low refractive index, poor wettability, poor optical clarity, poor miscibility with other monomers/reagents and toxicity.

The thermal polymerization products of trifluorovinyl-containing monomers, e.g., bis-trifluorovinyl monomers, to form perfluorocyclobutylene polymers are known. See, e.g., U.S. Pat. Nos. 5,021,602; 5,023,380; 5,037,917; 5,037,918; 5,037,919; 5,066,746; 5,159,036; 5,159,037; 5,159,038; 5,162,468; 5,198,513; 5,210,265; 5,246,782; 5,364,547; 5,364,917 and 5,409,777. U.S. Pat. No. 5,225,515 discloses poly(aromatic ether)polymers or copolymers containing perfluorocyclobutane rings in the polymer backbone. U.S. Pat. Nos. 5,246,782 and 5,409,777 further disclose that the polymers are useful as, for example, passivation coatings on medical instruments and in packaging for medical devices such as bandages and operating equipment. However, there has been no recognition or appreciation of trifluorovinyl aromatic containing poly(alkyl ether)prepolymers or that such prepolymers can be employed in the manufacture of biomedical devices and particularly contact lens applications.

Accordingly, it would be desirable to provide improved fluorinated materials for use in the manufacture of biomedical devices for prolonged contact with the body while also being biocompatible.

SUMMARY OF THE INVENTION

In accordance with one embodiment of the present invention, a poly(alkyl ether)prepolymer of the general formula T-(P)$_n$-T is provided wherein T is independently of the general formula

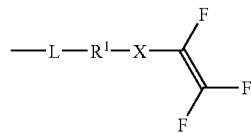

wherein n, L, R$^1$ and X are as defined herein and P is an oxyalkylene radical of the general formula

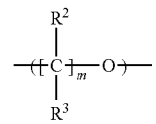

wherein m, R$^2$ and R$^3$ are as defined herein.

In accordance with a second embodiment of the present invention, a process for preparing a poly(alkyl ether)prepolymer of the general formula T-(P)$_n$-T is provided wherein T and P have the aforestated meanings, the process comprising reacting one or more trifluorovinyl halide containing compounds of the general formula

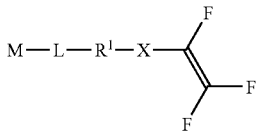

wherein M, L, R$^1$ and X are as defined herein and with one or more oxyalkylene alcohols of the general formula

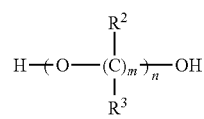

wherein m, n, R$^2$ and R$^3$ are as defined herein.

In accordance with a third embodiment of the present invention, a poly(alkyl ether)polymer or copolymer containing one or more perfluorocyclobutane aromatic ether radicals in the polymer backbone is provided.

In accordance with a fourth embodiment of the present invention, a polymerization product is provided comprising a monomeric mixture comprising one or more trifluorovinyl aromatic containing poly(alkyl ether)prepolymers of the general formula T-(P)$_n$-T wherein T and P have the aforestated meanings.

In accordance with a fifth embodiment of the present invention, a process for preparing a poly(alkyl ether)perfluoro aromatic containing polymer or copolymer is provided comprising polymerizing one or more trifluorovinyl aromatic containing poly(alkyl ether)prepolymers for a sufficient time to form the poly(alkyl ether)perfluoro aromatic containing polymer or copolymer.

Other embodiments of the present invention provides biomedical devices comprising the foregoing poly(alkyl ether) prepolymer and poly(alkyl ether)polymers or copolymers formed therefrom.

Yet other embodiments of the present invention provides a contact lens comprising foregoing poly(alkyl ether)prepolymer and poly(alkyl ether)polymers or copolymers formed therefrom.

BRIEF DESCRIPTION OF THE DRAWINGS

The figures set forth herein illustrate various embodiments of the present invention wherein.

DETAILED DESCRIPTION OF THE PREFERRED EMBODIMENTS

Figure 1:
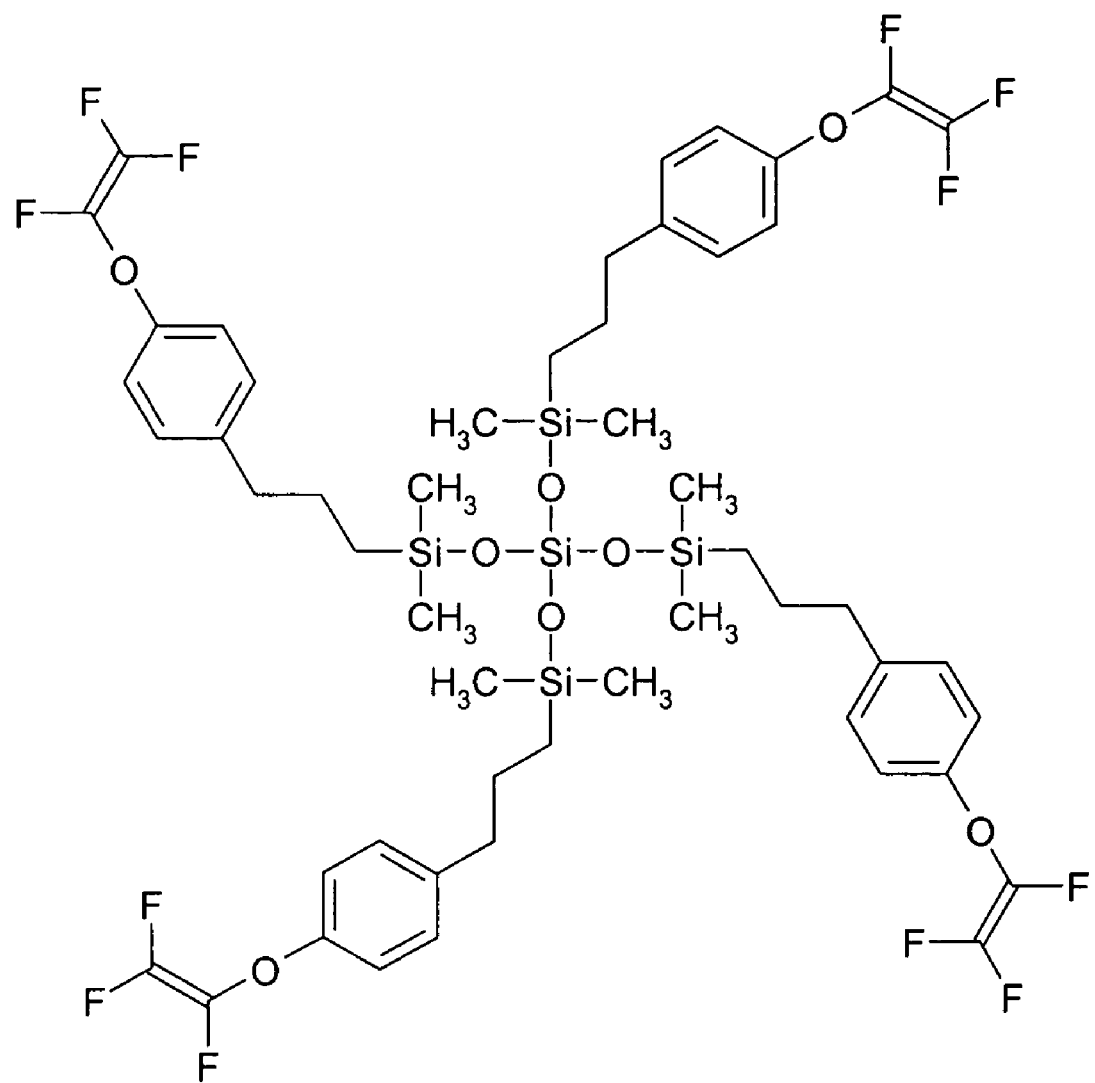
FIG. 1 is a poly(siloxane) containing star monomer which can be employed in the polymerization product of the present invention.

The present invention is directed to poly(alkyl ether)trifluorovinyl containing prepolymers possessing the general formula T-(P)$_n$-T wherein n is 1 to about 100,000, preferably from 3 to about 10,000 and more preferably from 5 to about 1000 and T is independently of the general formula

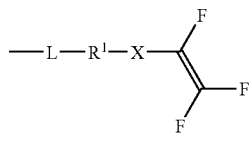

wherein L is an optional linking group and is independently a straight or branched $C_1$-$C_{30}$ alkyl group, a $C_3$-$C_{30}$ cycloalkyl group, a $C_5$-$C_{30}$ aryl group, an ether group, a $C_1$-$C_{20}$ ester group, an amide group, a siloxanyl, an arylsiloxanyl or a fluorosiloxanyl; $R^1$ independently represents one or more inertly substituted groups and X is independently a group which links the inertly substituted group and the trifluorovinyl group. As one skilled in the art would readily appreciate, the trifluorovinyl containing moiety can also be present as one or more pendant groups in the monomer, e.g., in the case where $R^1$ is an alkylene group such as ethylene or in the case where $R^1$ is a polycyclic group, as well as an end group(s). Preferably, the the trifluorovinyl containing moiety is present as an, end group. The X groups can be the same or different and include, but are not limited to, a bond, an oxygen atom, a sulfur atom, a carboxylic or thiocarboxylic ester group, an amide group, a sulfone, a sulfoxide, a carbonate, a carbamate, a perfluoroalkylene, a perfluoroalkylene ether, an alkylene, an acetylene, a phosphine, a carbonyl or thio carbonyl group, seleno, telluro, nitrido, a silanediyl group, a trisilanediyl group, a tetrasilanetetrayl group, a siloxanediyl group, a disiloxanediyl group, a trisiloxyldiyl group, a trisilazanyl group, a silythio group, a boranediyl group; and the like and combinations thereof. By "inert" it is meant that the structures or substituents do not react undesirably with the perfluorovinyl groups or interfere undesirably with polymerization (e.g., perfluorocyclobutane formation) of the monomers.

Representative $R^1$ groups include, by way of example, a substituted or unsubstituted $C_1$ to $C_{30}$ hydrocarbyl group such as a substituted or unsubstituted $C_1$ to about $C_{30}$ and preferably a substituted or unsubstituted $C_1$ to about $C_{16}$ alkyl or an aromatic group optionally containing one or more heteroatoms; or a $C_3$ to about $C_{25}$ cycloalkyl groups optionally containing one or more heteroatoms, substituted or unsubstituted siloxanyl group, or combinations thereof In one embodiment, $R^1$ comprises one or more substituted or unsubstituted cyclic or polycyclic containing groups, e.g., one or more substituted or unsubstituted aromatic groups optionally containing one or more heteroatoms, and wherein the X group and either the L or P group may independently be bonded to the cyclic group in a position either ortho, meta, and/or para with respect to one another. Suitable aromatic group(s) can be of any molecular structure having aromatic character such as at least one six membered aromatic ring, optionally having any number of such six-membered rings fused together or connected by bonds or linking structures. For example, the aromatic groups can have from 1 to about 50 such substituted or unsubstituted aromatic rings, and preferably from 1 to about 10 substituted or unsubstituted aromatic rings. If desired, when more than one cyclic containing group such as the aromatic groups are employed, the cyclic containing groups can be linked together with the same or different linking group, e.g., a $C_1$-$C_{20}$ alkylene or haloalkylene group optionally containing ether or ester linkages.

Examples of aromatic groups for use herein include, but are not limited to, the following structures:

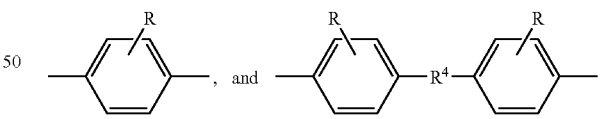

wherein R is independently hydrogen, a $C_1$-$C_{20}$ alkyl group, a hydroxyl group, a $C_1$-$C_{20}$ carboxylic acid group, a $C_1$-$C_{20}$ ester group, a $C_1$-$C_{20}$ alkoxy group, $CO_2^-$, $SO_3^-$, $PO_3^-$, $OPO_3^{2-}$, F, Br, I, $NA_2$ or $NA_3^+$ wherein A is independently hydrogen, a $C_1$-$C_{20}$ alkyl group, a hydroxyl group, a $C_1$-$C_{20}$ carboxylic acid group, a $C_1$-$C_{20}$ ester group, or a $C_1$-$C_{20}$ alkoxy group, or two R groups together with the carbon atom to which they are bonded are joined together to form a cyclic structure optionally containing one or more heterocyclic groups; $R^4$ is a bond, a $C_1$-$C_{20}$ alkylene or a haloalkylene group optionally containing ether or ester linkages and wherein the X group and either the L or P group may inde pendently be bonded to the aromatic group either ortho, meta and/or para with respect one another, e.g., structures such as

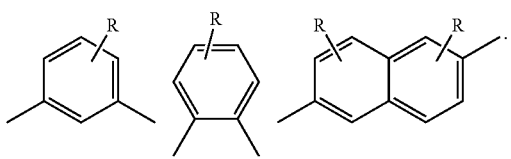

Representative examples of such aromatic groups include, but are not limited to,

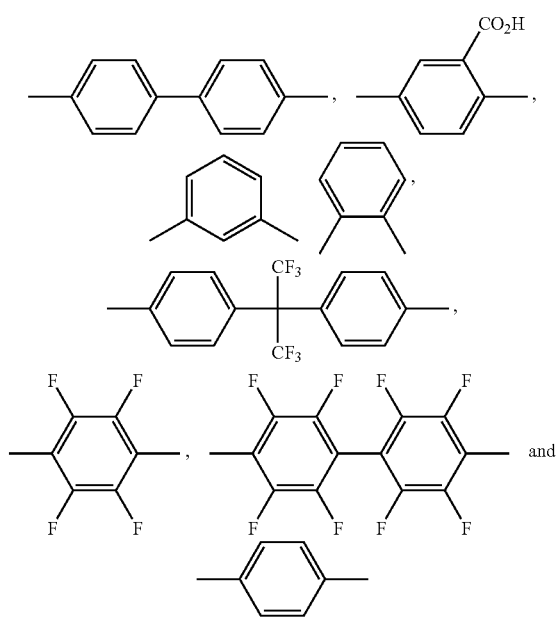

and the like.

P is independently an oxyalkylene radical of the formula

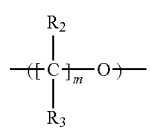

wherein $R^2$ and $R^3$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_5$-$C_{30}$ fluoroaryl group, an ether group, a $C_1$-$C_{20}$ ester group, an amide group an amine group, fluorine, a vinyl group, or a hydroxyl group and m is 1 to about 10 and preferably from 1 to about 4. Thus, for example, P can be one or more ethylene oxide radicals, one or more propylene oxide radicals, one or more butylene oxide radicals, one or more fluoroethylene oxide radicals, one or more fluoropropylene oxide radicals, one or more fluorobutylene oxide radicals, ethylene oxide-block-propylene oxide-block-ethylene oxide radicals and the like and combinations thereof. For the case of n being greater than one, each oxyalkylene radical can be any combination of repeating oxyalkylene units to form random or block copolymers.

The foregoing poly(alkyl ether)trifluorovinyl aromatic containing prepolymers can be obtained by reacting one or more trifluorovinyl halide containing compounds of the general formula

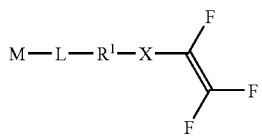

wherein L, $R^1$, and X have the aforestated meanings and M is a halide such as chloride or bromide; with one or more oxyalkylene alcohols of the general formula

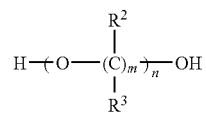

wherein $R^2$, $R^3$, m and n have the aforestated meanings.

In general, the trifluorovinyl halide containing compounds can be reacted with the oxyalkylene alcohols in a molar ratio of trifluorovinyl halide containing compound to oxyalkylene alcohol of from about 1:1 to about 10:1 and preferably from about 2:1 to about 10:1. The temperature for this reaction will ordinarily range from about −50° C. to about 100° C. and preferably from about 0° C. to about 50° C. The time period for this reaction will typically not exceed about 15 hours.

If desired, the reaction can be carried out in one or more suitable solvents. Useful solvents include, but are not limited to, acetates, e.g., methyl acetate, ethyl acetate, propyl acetate, isopropyl acetate, n-butyl acetate, isobutyl acetate, and the like and mixtures thereof; ethers, e.g., ethyl ether, tetrahydrofuran (THF), methyl tert-butyl ether (MTBE) and the like and mixtures thereof; aromatic solvents, e.g., toluene, trifluorotoluene, hexafluoroxylene, xylene, and the like and mixtures thereof; halogenated hydrocarbons, e.g., dichloromethane, ethylene dichloride and the like and mixtures thereof; acetonitrile; N-methyl-2-pyrrolidone (NMP); N,N-dimethylformamide (DMF) and combinations of two or more of these. Generally, the reactants can be present in the solvent in a concentration ranging from about 0.05 M to about 3 M.

As one skilled in the art will readily appreciate, other agents can be present in the reaction mixture during this reaction. For example, tertiary amines such as triethylamine and activating agents such as N,N'-dicyclohexylcarbodiimide (DCC) can be employed in the reaction. Following the reaction, the product prepolymer can be purified by known techniques.

The poly(alkyl ether)trifluorovinyl aromatic containing prepolymers thus obtained can be polymerized for a time sufficient to form poly(alkyl ether)perfluoro aromatic containing polymers or copolymers. In one embodiment, at least a monomeric mixture containing at least one or more of the foregoing poly(alkyl ether)trifluorovinyl aromatic containing prepolymers can be polymerized by heating the monomeric mixture to a temperature and for a time sufficient to form polymerization products having one or more perfluorocyclobutane aromatic containing radicals in the polymer backbone. By heating the monomeric mixture, the dimerizable perfluorovinyl groups reacts with another to form one or more perfluorocyclobutane aromatic containing radicals in the polymer backbone as represented by the general formula:

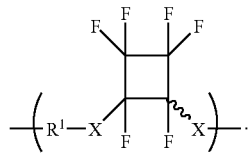

Thus, the resulting polymerization products can have one or more perfluorocyclobutane aromatic containing radicals, and includes oligomers which have from about 2 to about 100 repeating units. It is to be understood that depending on the molecular structure connecting the perfluorocyclobutane aromatic containing radicals, the number of perfluorocyclobutane aromatic containing radicals can vary from as few as one up to thousands. Generally, the molecular weight of the resulting polymerization products can vary widely, e.g., a number average molecular weight of at least about 100 and can range from about 100 to about 1,000,000. The process of forming polymers or oligomers herein is general and capable of forming biomedical devices having wide ranges of utility. The physical and chemical properties of the resulting products are highly dependent on the choice of the molecular structure between the perfluorocyclobutane aromatic containing radicals as well as the number of perfluorocyclobutane groups. Whereas polyaddition of perfluorovinyl groups to form perfluoroaliphatic polymers (like polytetrafluoroethylene), not generally having perfluorocyclobutane groups, takes place in the presence of free radicals or free radical generating catalysts, dimerization to form perfluorocyclobutane groups takes place thermally.

When a perfluorovinyl group is dimerizable, dimerization is preferably favored over other thermal reactions either kinetically or in equilibrium. As one skilled in the art would readily appreciate, the perfluorovinyl groups on the prepolymer can be separated by at least one atom or group of atoms which does not facilitate isomerization. The atom or group of atoms can include at least one aromatic group or can include a cycloalkyl group. However, aromatic groups are usually preferred due their ease of manufacturing monomers.

Suitable temperatures for forming, one or more perfluorocyclobutane aromatic containing radicals can differ according to the structure of the prepolymer(s). In general, temperatures can range from about 50° C. to about 400° C. and preferably from about 75° C. to about 300° C. for formation of perfluorocyclobutane aromatic containing radicals. Temperatures above about 450° C. are usually avoided because perfluorocyclobutane aromatic containing radicals are generally thermally unstable above such temperatures. A suitable time can vary according to the temperature used and the structure of the momoner. Generally, the time period for the polymerization can range from about 1 hour to about 100 hours and preferably from about 10 hours to about 40 hours.

Alternatively, in the case when the trifluorovinyl aromatic containing prepolymers are capable of radical initiated addition polymerization, conditions conducive to free radical polymerization, e.g. presence of oxygen, ozone, peroxygen compounds and other free radical generating compounds, are avoided so that the trifluorovinyl groups will dimerize into perfluorocyclobutane aromatic containing containing radicals rather than undergoing addition polymerization. Compounds known in the art for stabilization against free radical polymerization are alternatively used. Similarly, when the trifluorovinyl groups are capable of addition polymerization in the presence of anions or cations, compounds which supply such anions or cations are avoided. For example, fluoride ions (e.g. from carbonyl fluorides), chloride, hydroxide, phenoxide and the like are avoided. To avoid such compounds as carbonyl fluorides, oxidative conditions such as the presence of oxygen, hypochlorite, dichromate, permanganate and the like are avoided because the perfluorovinyl groups are known to oxidize to form carbonyl fluorides. Perfluorovinyl ethers, thioethers, sulfones, sulfoxides and the like are relatively stable with regard to addition polymerization and oxidation; and, therefore, such precautions are generally unnecessary when such perfluorovinyl compounds are used.

The monomeric mixtures are suitably neat or, optionally, in admixture with other materials such as in a solution, an emulsion, a dispersion or in any other form which can provide a polymerization product.

Suitable solvents are those which are inert to the conditions encountered in the polymerization reaction and include, but are not limited to, xylene, mesitylene and perfluorotetradecahydrophenanthrene. At atmospheric pressure, preferred solvents are those which attain temperatures of about 170° C. to about 250° C. such as, for example, dichlorobenzene, trichlorobenzene, diphenyl oxide and perfluorotetradecahydrophenanthrene. When a solvent is used, the concentration of monomers in solvent is advantageously from about 0.1 to about 99.9 weight percent and preferably from about 10 to about 90 weight percent by weight monomer.

Polymerization or dimerization suitably takes place at any pressure. Pressures are generally chosen such that the monomeric mixtures and any solvents and/or dispersing media remain liquid at the temperatures used for polymerization. When the monomeric mixtures or other materials evaporate at temperatures used, then it is generally preferable to maintain a pressure at least sufficient to maintain the materials liquid.

Alternatively, the foregoing monomeric mixtures may be polymerized by free radical polymerization by exposing the mixtures to heat and/or radiation, e.g., ultraviolet light (UV), visible light, or high energy radiation, to produce biomedical devices such as contact lenses according to conventional methods. A polymerization initiator may be included in the mixture to facilitate the polymerization step. Representative free radical thermal polymerization initiators are organic peroxides such as, for example, acetal peroxide, lauroyl peroxide, decanoyl peroxide, stearoyl peroxide, benzoyl peroxide, tertiarylbutyl peroxypivalate, peroxydicarbonate, and the like and mixtures thereof. Representative UV initiators are those known in the field such as, for example, benzoin methyl ether, benzoin ethyl ether, Darocure 1173, 1164, 2273, 1116, 2959, 3331 (EM Industries) and Igracure 651 and 184 (Ciba-Geigy), and the like and mixtures thereof. Generally, the initiator will be employed in the monomeric mixture at a concentration at about 0.1 to about 5 percent by weight of the total mixture.

If desired, the monomeric mixtures can further include one or more additional prepolymers. Representative examples of such prepolymers include, but are not limited to, poly(siloxane)prepolmers, poly(aromatic ether)prepolymers, poly(perfluorocyclobutane)prepolymers, copolymers thereof and the like and mixtures thereof. For example, the poly(siloxane) prepolymers can be represented by the general formula

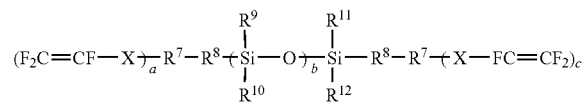

wherein a and c are independently integers from 1 to about 1000, preferably 1 to about 100, more preferably from 1 to about 10 and most preferably from 1 to about 5; b is an integer from 1 to about 1000; $R^7$ independently represents one or more inertly substituted groups as defined above for $R^1$; X is independently a group which links the inertly substituted groups and the trifluorovinyl group and has the aforstated meanings; $R^8$ is independently an amide group, a $C_1$-$C_{20}$ ester group, an ether group, an ureido, a substituted or unsubstituted $C_3$-$C_{30}$ cyclicalkyl, or a $C_1$-$C_{30}$ alkylene or haloalkylene group optionally containing ether or ester linkages; and $R^9$, $R^{10}$, $R^{11}$ and $R^{12}$ are independently hydrogen, a straight or branched $C_1$-$C_{30}$ alkyl group, a $C_1$-$C_{30}$ fluoroalkyl group, one or more substituted or unsubstituted aromatic groups, a $C_1$-$C_{20}$ ester group, an ether group, an ureido group, an amide group, an amine group, a substituted or unsubstituted $C_1$-$C_{30}$ alkoxy, a substituted or unsubstituted $C_3$-$C_{30}$ cycloalkyl, a substituted or unsubstituted $C_3$-$C_{30}$ cycloalkylalkyl, a substituted or unsubstituted $C_3$-$C_{30}$ cycloalkenyl, a substituted or unsubstituted $C_5$-$C_{30}$ aryl, a substituted or unsubstituted $C_5$-$C_{30}$ arylalkyl, a substituted or unsubstituted $C_5$-$C_{30}$ heteroaryl, a substituted or unsubstituted $C_3$-$C_{30}$ heterocyclic ring, a substituted or unsubstituted $C_4$-$C_{30}$ heterocyclylalkyl, a substituted or unsubstituted $C_6$-$C_{30}$ heteroarylalkyl, fluorine, a vinyl group, a $C_5$-$C_{30}$ fluoroaryl, or a hydroxyl group. These prepolymers can be obtained by methods known in the art and does not constitute a part of the present invention. Other poly(siloxanes)prepolymers can be those set forth in FIGS. 1-3.

The forgoing prepolymers and polymerization products are particularly useful as biomedical devices intended for direct contact with body tissue or fluid. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses. A wide variety of types of contact lens materials can be produced herein ranging from hard, gas permeable lens materials; soft, hydrogel lens materials to soft, non-hydrogel lens materials. A particularly preferred contact lens is a rigid gas permeable lens.

The biomedical devices, e.g., contact lenses or intraocular lenses, can be prepared by polymerizing the foregoing trifluorovinyl aromatic containing poly(alkyl ether)prepolymers to form a product that can be subsequently formed into the appropriate shape by, for example, lathing, injection molding, compression molding, cutting and the like. Alternatively, the reaction mixture may be placed in a mold and subsequently cured into the appropriate product.

For example, in producing contact lenses, the initial monomeric mixture containing the foregoing trifluorovinyl aromatic containing poly(alkyl ether)prepolymers may be polymerized in tubes to provide rod-shaped articles, which are then cut into buttons. The buttons may then be lathed into contact lenses. Alternately, the contact lenses may be cast directly in molds from the monomeric mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the monomer mixture to a mold, and spinning the mold in a controlled manner while exposing the monomer mixture to a radiation source such as UV light. Static casting methods involve charging the monomeric mixture between two mold sections, one mold section shaped to form the anterior lens surface and the other mold section shaped to form the posterior lens surface, and curing the monomeric mixture while retained in the mold assembly to form a lens, for example, by free radical polymerization of the monomeric mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

When polymerizing the monomeric mixture by the thermal technique discussed above, a resin or metal material that is capable of withstanding high temperatures, i.e., thermally stable, should be employed as a contact lens mold. For example, in injection molding, the resin should have a heat deflection temperature of at least 350° C. and a hardness of at least 100 on the Rockwell Hardness Scale (M scale). Suitable resins include, but are not limited to, engineering plastics based on polyetherimide resins (e.g., ULTEM™ available from General Electric Co., Polymers Product Dept.); polyamide-imide plastics (e.g., TORLON available from Amoco Performance Products); polyphenylene sulfide plastics (e.g., RYTON™ available from Phillips Petroleum Co.); polysulfone and polyarylsulfone plastics (e.g., UDEL™ and RADEL™ available from Amoco Performance Products); polythalamide plastics (e.g., AMODEL™ available from Amoco Performance Products); polyketone plastics (e.g., KADEL™ available from Amoco Performance Products); various liquid crystal polymer resins (e.g., XYDAR™ available from Amoco Performance Products) and the like.

Optionally, the monomeric mixtures herein may include additional components according to the specific type of lens being produced. For example, when producing rigid gas-permeable (RGP) materials, the monomeric mixture may further include one or more crosslinking agents, a small amount of a wetting monomer; and optionally other agents such as strengthening agents or UV absorbing or dye monomers. The crosslinking and wetting agents can include those crosslinking and wetting agents known in the prior art for making RGP materials. The content of the crosslinking agent is chosen to provide a dimensionally stable lens material resistant to breakage and stress crazing. The amount of wetting monomer used is adjusted within limits to provide sufficient wetting characteristics so as to maintain a stable tear film while at the same time keeping a sufficiently low water content, e.g., a polymer system containing less than about 5 wt. % water.

When producing a hydrogel lens, the monomeric mixture may further include at least a diluent that is ultimately replaced with water when the polymerization product is hydrated to form a hydrogel. Generally, the water content of the hydrogel is greater than about 5 wt. % and more commonly between about 10 wt. % to about 80 wt. %. The amount of diluent used should be less than about 50 wt. % and in most cases, the diluent content will be less than about 30 wt. %. However, in a particular polymer system, the actual limit will be dictated by the solubility of the various monomers in the diluent. In order to produce an optically clear copolymer, it is important that a phase separation does not occur between the comonomers and the diluent, or the diluent and the final polymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate)s; glycol esters of lactic acid; formamides; ketones; dialkylsulfoxides; butyl carbitol; and the like and mixtures thereof. If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired the monomeric mixture used to produce the hydrogel lens may further include crosslinking and wetting agents known in the prior art for making hydrogel materials.

The contact lenses obtained herein may be subjected to optional machining operations. For example, the optional machining steps may includes buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be tuned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative of the invention. The examples should not be read as limiting the scope of the invention as defined in the claims.

EXAMPLE 1

Synthesis of end-capped poly(ethylene oxide)prepolymer (prepolymer 1)

A solution of 4-(trifluorovinyloxy)benzoyl chloride (1.85 g, 7.8 mmol) prepared from 1-bromo-4-(trifluorovinyloxy) benzene obtained from Oakwood Products, Inc. (West Columbia, S.C.) using procedures set forth in the literature (e.g., *Polymer Preprints*, 43(1), p. 487 (2002)) in tetrahydrofuran (5 mL) was treated with a solution of poly(ethylene oxide) having a $M_n$ of 300 (0.78 g, 2.6 mmol) and triethylamine (1.21 mL, 8.7 mmol) in tetrahydrofuran (5 mL) dropwise under inert atmosphere. After 15 hours at ambient temperature, the reaction mixture was diluted in dichloromethane (30 mL), washed with $NaHCO_3$(aq) (0.25 M, 1×25 mL), dried over $Na_2SO_4$, filtered, and solvents were removed under reduced pressure. The crude oil was purified by column chromatography (3×3 cm, silica gel, 0-50% dichloromethane/pentane) and solvents removed under reduced pressure to afford the product as a viscous oil (0.42 g, 23%): $^1$H NMR (CDCl$_3$, 400 MHz): δ 8.06 (d, 4 H, J=8 Hz), 7.11 (d, 4 H, J=8 Hz), 4.48 (br, 4 H), 3.79 (br, 4 H), 3.61 (br, 22.3 H); SEC (THF, PS standards): $M_n$=1006 g/mol, $M_w$=1234 g/mol, and a PD 1.23. This reaction is generally shown below in Scheme 1.

SCHEME 1

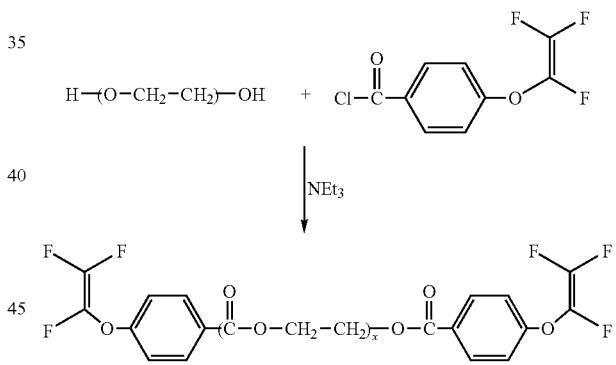

wherein x is approximately 7.

EXAMPLE 2

Synthesis of end-capped poly(ethylene oxide-block-propylene oxide-block-ethylene oxide) prepolymer (prepolymer 2)

Polyoxamer 108 supplied as Pluronic F38 (4700 g/mol, 3.45 g), obtained from BASF Co. (Florham Park, N.J.) was reacted using substantially the same procedure described in Example 1 to afford the product as a solid (2.01 g, 54%): GPC (THF, PS standards): $M_n$=9637 g/mol, $M_w$=8761 g/mol, PD=1.10; $^1$H NMR (CDCl$_3$, 400 MHz); δ 8.08 (d, J=8Hz, 4H), 7.13 (d, J=8 Hz, 4H), 4.54 (t, J=5 Hz, 4H), 3.82-3.37 (m, 530 H), 1.15-1.11 (m, 60 H). The final product is represented by the following formula:

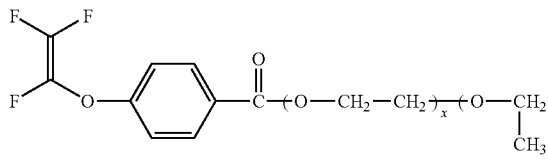
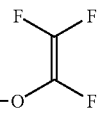

wherein x is y and z are such that the product has a $M_n$=9637 g/mol, $M_w$=8761 g/mol, and PD=1.1.

EXAMPLE 3

Synthesis of end-capped poly(perfluoroalkyl ether)prepolymer (prepolymer 3)

Fomblin Z DOL 2000 (a hydroxy terminated poly(perfluoroethylene containing glycol)) (2000 g/mol) obtained from Solvay Solexis (Thorofare, N.J.) was reacted using substantially the same procedure described in Example 5 except using dichloromethane instead of tetrahydrofuran as solvent to afford the product as a viscous oil (0.58 g, 17%): GPC (THF, PS standards): $M_n$=1604 g/mol, $M_w$=1656 g/mol, PD=1.05 g/mol; $^1$H NMR (CDCl$_3$, 400 MHz); δ 8.08 (d, J=8 Hz, 4 H), 7.15 (d, J=8Hz, 4H), 4.67 (m, 4.70-4.64, 4H). The final product is represented by the following formula:

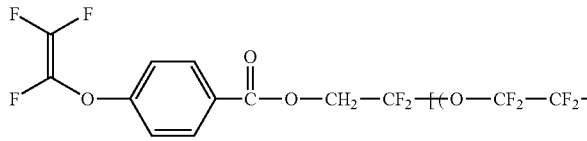

wherein m and n are such that the product has a $M_n$=1604, $M_w$=1656 g/mol, and PD=1.05.

EXAMPLE 4

Samples of the materials from Examples 1-3 were clamped between silanized glass plates with Teflon spacers and heated under nitrogen atmosphere at 195° C. for various times. In each case the isolated products were oils of varied viscosities. The linear polymers were dissolved in tetrahydrofuran (5 mg/mL) and analyzed via GPC (relative to PS standards) to demonstrate increase in molecular weight as a function of thermal cure time. The molecular weight analysis of the polymerized products are set forth below in Table 1.

TABLE 1

Molecular Weight Analysis of Thermal Trifluorovinylarylether end-capped Poly(alkylether) Polymerization at 195° C. as Determined by SEC

| Cure time (h) | Prepolymer 1 (g/mol) | PD | Prepolymer 2 (g/mol) | PD | Prepolymer 3 (g/mol) | PD |
|---|---|---|---|---|---|---|
| 0 | 1006 | 1.23 | 9637 | 1.10 | 1604 | 1.05 |
| 20 | 2123 | 2.35 | 13205 | 1.43 | 2815 | 1.45 |
| 40 | 2945 | 2.60 | 19529 | 1.82 | 4707 | 1.71 |

EXAMPLE 5

This example illustrates the preparation of a 3-(4-[trifluorovinyloxy]phenyl)propyl terminated poly(dimethylsiloxane) having a number average molecular weight ($M_n$) of 1128, a weight average molecular weight of 1523 and a polydispersity (PD) of 1.35 (as determined using SEC and by comparison to standards of known molecular weight) and of the formula

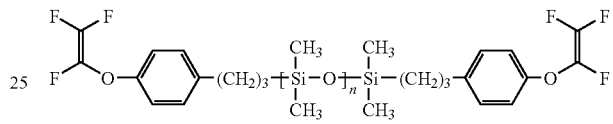

wherein n is an average of 8.

To a solution of hydride terminated poly(dimethylsiloxane) obtained from Aldrich Chemical Co. (Milwaukee, Wis.) (average $M_n$ 580 g/mol, 3.47 g) and 4-(trifluorovinyloxy) allylbenzene (3.87 g, 17.9 mmol) prepared from 1-bromo-4-(trifluorovinyloxy)benzene obtained from Oakwood Products, Inc. (West Columbia, S.C.) using procedures set forth in the literature (e.g., *Polymer Preprints,* 39(1), p. 530 (1998)) in tetrahydrofuran/1,4-dioxane (2:1 v/v, 36 mL) was added 10% solution of platinum-1,3-divinyl-1,1,3,3-tetramethyldisiloxane complex in xylenes (0.01 mL) and the solution was heated 15 hours at 60° C. The solvents were removed from the cooled solution at reduced pressure and the crude product was purified via column chromatography (0-50% dichloromethane/pentane, silica gel, 5×5 cm) to provide a product as a colorless oil (3.95 g, 66%): $^1$H NMR (CDCl$^3$, 400 MHz) δ 7.15 (d, J=8 Hz, 4 H), 7.00 (d, J=8 Hz, 4 H), 2.60 (t, J=8 Hz, 4 H), 1.66-1.60 (m, 4 H), 0.57 (t, J=8 Hz, 4 H), 0.07 (s, approximately 63 H).

EXAMPLE 6

Figure 4:
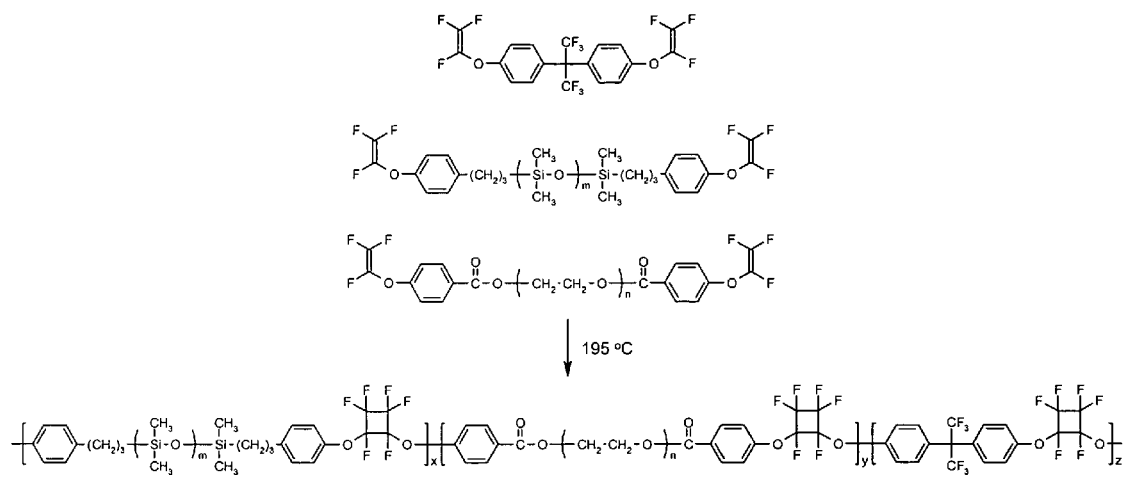
FIG. 4 illustrates the general reaction scheme of Example 6.

Copolymerization of T end-capped poly(alkyl ether), poly(siloxane), and poly(PFCB)prepolymers A monomeric mixture was prepared by dissolving 0.42 g of 4-(trifluorovinyloxy)benzoate terminated poly(ethylene glycol) (1) having a $M_n$ of 1006, a weight average molecular weight ($M_w$) of 1234 and a PD of 1.23, 3-4-[trifluorovinyloxy]phenyl)propyl terminated poly(dimethylsiloxane) (2) of Example 1, and 0.43 g (1.11 mmol) of 2,2-bis(4-[trifluorovinyloxy]phenyl)-1,1,1,3,3,3-hexafluoropropane (3), with stirring and gentle heating. The warm solution (insoluble at ambient temperature) was clamped between silanized glass plates with a Teflon tape spacer and heated at 195° C. for 40 hours under nitrogen purge to afford a viscous, transparent oil (1.28 g, 100%); SEC (THF, PS standards). The reaction scheme of this example is generally set forth in FIG. 4 wherein m and n and x, y, and z are such that the copolymer has a $M_n$=3641, $M_w$=14664, and PD=4.03. The weight average molecular weight ($M_w$) was measured at various points during curing. These results are set forth below in Table 2.

TABLE 2

| Cure time | Weight average molecular weight (g/mol) | | | |
|---|---|---|---|---|
| (h) | 1 | 2 | 3 | Copolymer |
| 0 | 1234 | 2054 | N/A | N/A |
| 20 | 4993 | 8478 | 4133 | 6836 |
| 40 | 7668 | 15914 | 7498 | 14664 |

EXAMPLE 7

Synthesis of 2,4,6,8,10-pentamethyl-2,4,6,8,10-penta (3-[4-trifluorovinyloxyphenyl]propyl)cyclopentasiloxane (cyclo-(TD)$_5$)

Figure 2:
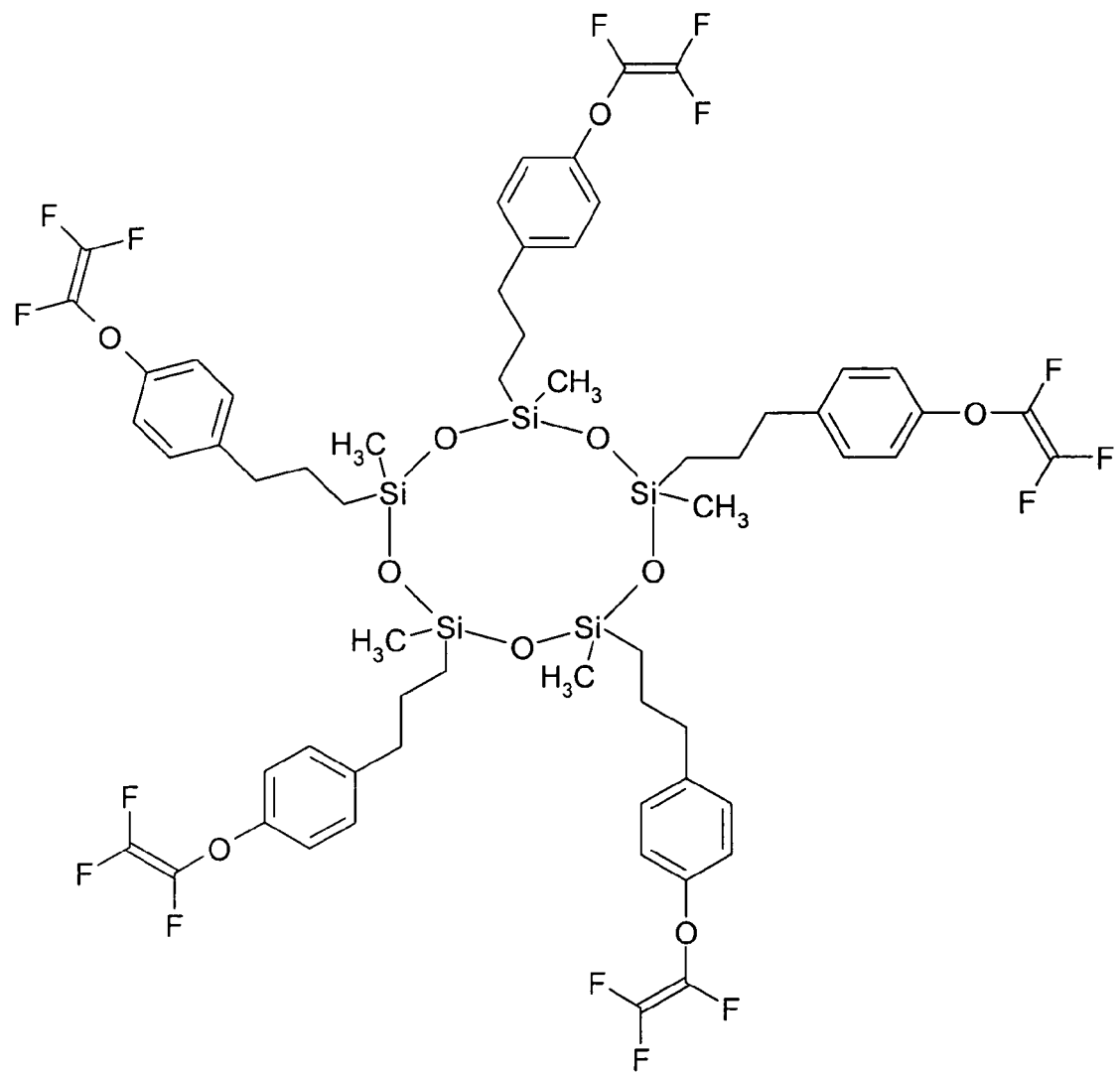
FIG. 2 is a poly(siloxane) containing cyclic monomer which can be employed in the polymerization product of the present invention.
Figure 3:
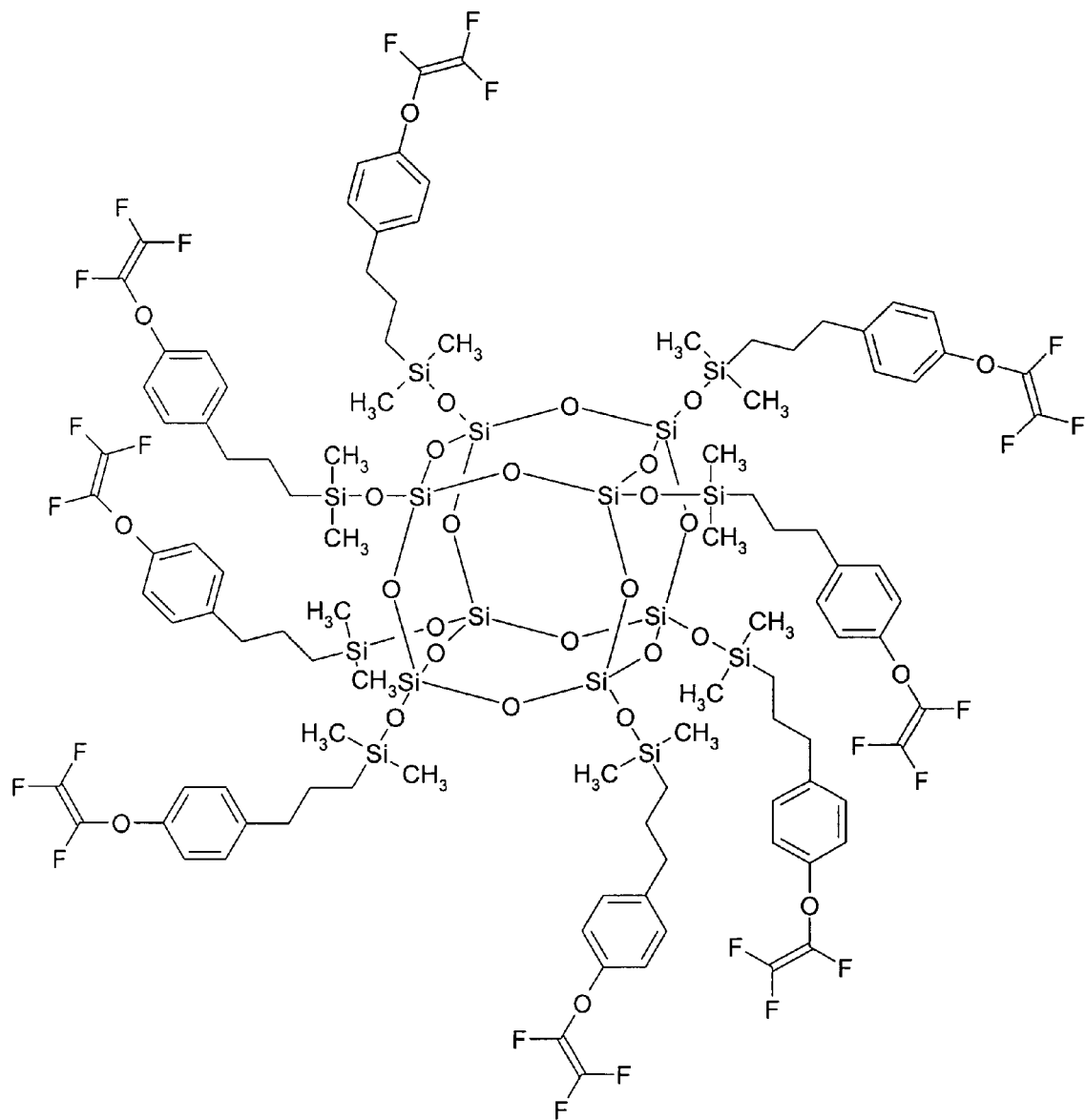
FIG. 3 is a poly(siloxane) containing polycyclic monomer which can be employed in the polymerization product of the present invention.

A solution of 2,4,6,8,10-pentamethylcyclopentasiloxane (0.34 g, 1.13 mmol) and 4-(trifluorovinyloxy)allylbenzene (1.83 g, 8.55 mmol) in 2:1 tetrahydrofuran/1,4-dioxane (17 mL) was treated with 10% platinum-1,3-divinyl-1,1,3,3-tetramethyldisiloxane complex in xylenes (0.09 mL) and heated at 60° C. for 15 hours. The cooled solution was concentrated under reduced pressure and purified via column chromatography (0-50% ethyl ether/pentane, silica gel, 3×10 cm) to afford the product as a viscous oil (57 mg, 4%): $^1$H NMR (CDCl$_3$, 400 MHz) δ 7.09 (br, 2 H), 6.99 (br, 2 H), 2.55 (br, 2 H), 1.59 (br, 2 H), 0.5 (br, 2 H), 0.02 (br, 3H). The final product is shown in FIG. 2.

EXAMPLE 8

Homopolymerization of cyclo-(TD)$_5$

The product prepared in Example 7 was clamped between two silanized glass plates with Teflon tape spacer and heated at 195° C. under a nitrogen purge for 20 hours to result in a transparent, insoluble, tack-free film: DSC, T$_g$ 94° C.

EXAMPLE 9

Crosslinking of 3-(4-[trifluorovinyloxy]phenyl)propyl terminated poly(dimethylsiloxane) (T$_2$D$_8$) using cyclo-(TD)$_5$ The product of Example 7 (25 parts) and 3-(4-[trifluorovinyloxy]phenyl)propyl terminated poly(dimethylsiloxane) of Example 5 (75 parts) were dissolved with gentle heat and agitation and polymerized as in Example 8 to result in a transparent, insoluble, tack-free film: DSC, no transitions observed –100 to 300° C.

EXAMPLE 10

Thermal cast molding of poly(perfluorocyclobutane) films

The material of Example 1 and 1,1,1-tris(4-[trifluorovinyloxy]phenyl)ethane obtained from Oakwood Products, Inc. (West Columbia, S.C.) is melted with gentle heating and clamped between glass plates with Teflon® tape spacers of varied thicknesses. The assemblies can be sealed in a heating oven with a constant N$_2$ purge and heated for 20 hours at 195° C. The cooled films can then be removed from the plates and believed to yield a transparent, colorless, glassy film. The films can be further cut into wafers for oxygen permeability and refractive index determination:

EXAMPLE 11

Thermal cast molding of poly(perfluorocyclobutane) button

The material of Example 1 and 1,1,1-tris(4-[trifluorovinyloxy]phenyl)ethane obtained from Oakwood Products, Inc. (West Columbia, S.C.) is added to a flat-bottomed, 15 mm diameter glass test tube. The vessel is sealed in a heating oven with a constant N$_2$ purge and heated for 68 hours at 155° C. The cooled vessel is removed from the oven and test tube and believed to yield a transparent, colorless, glassy button for lathing into a Rigid, Gas-Permeable (RGP) contact lens.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A poly(alkyl ether)prepolymer of the general formula T-(P)$_n$-T wherein n is 1 to about 100,000, T is independently of the general formula

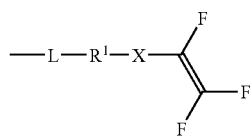

wherein L is an optional linking group and is independently a straight or branched C$_1$-C$_{30}$ alkylene group, a C$_3$-C$_{30}$ cycloalkylene group, a C$_5$-C$_{30}$ aryl group, an ether group, a C$_1$-C$_{20}$ ester group, an amide group, a siloxanyl, an arylsiloxanyl or a fluorosiloxanyl, R$^1$ independently represents one or more inertly substituted groups; X is independently a group which links the inertly substituted groups and the trif luorovinyl group; and P is independently an oxyalkylene radical of the general formula

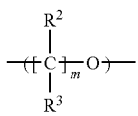

wherein $R^2$ and $R^3$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_3$-$C_{30}$ fluorocycloalkyl group, a $C_5$-$C_{30}$ fluoroaryl group, an ether group, a $C_1$-$C_{20}$ ester group, an amide group an amine group, fluorine, a vinyl group, or a hydroxyl group and m is 1 to about 10.

2. The poly(alkyl ether)prepolymer of claim 1, wherein $R^1$ comprises a substituted or unsubstituted cyclic or polycyclic group optionally containing one or more heteroatoms and X is independently a bond, an oxygen atom, a sulfur atom, a carboxylic or thiocarboxylic ester group, a sulfone, a sulfoxide, perfluoroalkylene, perfluoroalkylene ether, alkylene, acetylene, a phosphine, a carbonyl or thiocarbonyl group; seleno; telluro; nitrido; a silanediyl group, a trisilanediyl group, a tetrasilanetetrayl group, a siloxanediyl group, a disiloxanediyl group, a trisiloxyl group, a trisilazanyl group, a silythio group, or a boranediyl group.

3. The poly(alkyl ether)prepolymer of claim 1, wherein X is O, $R^1$ is one or more aromatic groups selected from the group consisting of

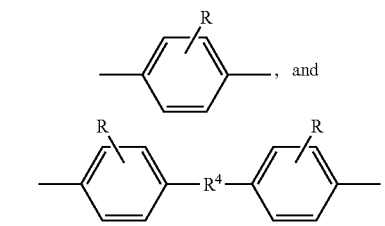

wherein R is independently hydrogen, a $C_1$-$C_{20}$ alkyl group, a hydroxyl group, a $C_1$-$C_{20}$ carboxylic acid group, a $C_1$-$C_{20}$ ester group, a $C_1$-$C_{20}$ alkoxy group, $CO_2^-$, $SO_3^-$, $PO_3^-$, $OPO_3^{2-}$, F, Br, I, $NA_2$ or $NA_3^+$ wherein A is independently hydrogen, a $C_1$-$C_{20}$ alkyl group, a hydroxyl group, a $C_1$-$C_{20}$ carboxylic acid group, a $C_1$-$C_{20}$ ester group, or a $C_1$-$C_{20}$ alkoxy group, or two R groups together with the carbon atom to which they are bonded are joined together to form a cyclic structure optionally containing one or more heterocyclic groups; $R^4$ is a bond, a $C_1$-$C_{20}$ alkylene or haloalkylene group optionally containing ether or ester linkages and wherein the X group and either the L or P group may independently be bonded to the aromatic group either ortho, meta and/or para with respect one another.

4. The poly(alkyl ether)prepolymer of claim 1, wherein $R^2$ and $R^3$ are independently a straight or branched $C_1$-$C_6$ alkyl group.

5. The poly(alkyl ether)prepolymer of claim 1, wherein $R^2$ and $R^3$ are independently a straight or branched $C_1$-$C_6$ fluoroalkyl group.

6. The poly(alkyl ether)prepolymer of claim 1, wherein n is 3 to about 10,000, X is O, $R^2$ and $R^3$ are independently a straight or branched $C_1$-$C_6$ alkyl group and the oxyalkylene units are formed as random copolymers.

7. The poly(alkyl ether)prepolymer of claim 1, wherein n is 3 to about 10,000, X is O, $R^2$ and $R^3$ are independently a straight or branched $C_1$-$C_6$ alkyl group and the oxyalkylene units are formed as block copolymers.

8. The poly(alkyl ether)prepolymer of claim 1, wherein n is 3 to about 10,000, X is O, $R^2$ and $R^3$ are independently a straight or branched $C_1$-$C_6$ fluoroalkyl group and the oxyalkylene units are formed as random copolymers.

9. The poly(alkyl ether)prepolymer of claim 1, wherein n is 3 to about 10,000, X is O, $R^2$ and $R^3$ are independently a straight or branched $C_1$-$C_6$ fluoroalkyl group and the oxyalkylene units are formed as block copolymers.

10. The poly(alkyl ether)prepolymer of claim 1, which is selected from the group consisting of

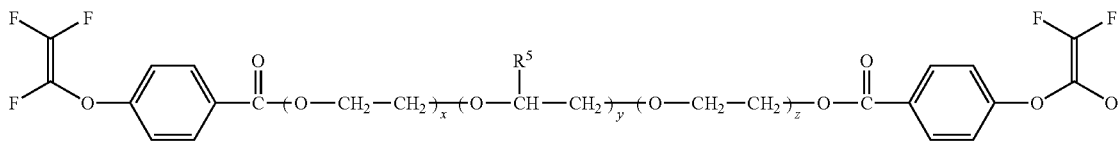

wherein x, y and z are independently 0 and at least 1 with x+y+z being from 1 to equal to or less than about 10,000 and $R^5$ is independently hydrogen or a $C_1$-$C_4$ alkyl group; and

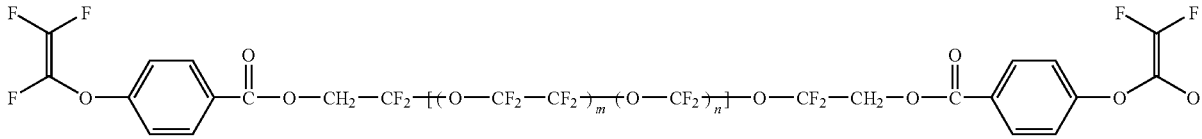

wherein m and n are independently 0 and at least 1 with m+n being from 1 to equal to or less than about 10,000.

11. A biomedical device comprising the poly(alkyl ether) prepolymer of claim 1.

12. The biomedical device of claim 11, which is an ophthalmic lens.

13. The biomedical device of claim 12, wherein the ophthalmic lens is a contact lens.

14. The biomedical device of claim 13, wherein the contact lens is a rigid gas permeable lens.

* * * * *